United States Patent
Akimoto

[11] 3,904,742
[45] Sept. 9, 1975

[54] METHOD FOR DIRECTLY PREPARING A SULFATE OR SULFATES FROM EXHAUST GASES CONTAINING SO$_2$ GAS

[76] Inventor: Ken Akimoto, 20 Kamoi 2-chome, Yokosuka, Kanagawa, Japan

[22] Filed: Mar. 8, 1973

[21] Appl. No.: 339,324

[30] Foreign Application Priority Data
Mar. 18, 1972 Japan.............................. 47-27895

[52] U.S. Cl................................ 423/554; 423/242
[51] Int. Cl.$^2$...................... C01F 5/40; C01F 11/46
[58] Field of Search............ 423/554, 555, 212, 242

[56] References Cited
UNITED STATES PATENTS

| | | | |
|---|---|---|---|
| 427,467 | 5/1890 | Dormer............................ | 423/555 |
| 714,984 | 12/1902 | Wing................................ | 423/554 |
| 1,356,907 | 10/1920 | Collings et al.................. | 423/554 |
| 1,609,872 | 12/1927 | Garner et al.................... | 423/242 |
| 2,021,936 | 11/1935 | Johnstone....................... | 423/242 |
| 2,090,142 | 8/1937 | Nonhebel et al................ | 423/242 |
| 2,113,198 | 4/1938 | Nonhebel et al................ | 423/242 |
| 3,226,192 | 12/1965 | Atsukawa et al............... | 423/242 |
| 3,556,722 | 1/1971 | Owaki............................. | 423/555 |
| 3,794,714 | 2/1974 | Atsukawa et al............... | 423/242 |
| 3,808,321 | 4/1974 | Fukui et al...................... | 423/242 |

FOREIGN PATENTS OR APPLICATIONS
396,969  8/1933  United Kingdom................ 423/242

Primary Examiner—Oscar R. Vertiz
Assistant Examiner—Gary P. Straub
Attorney, Agent, or Firm—George B. Oujevolk

[57] ABSTRACT

A method for directly preparing at least one sulfate from exhaust gases containing SO$_2$, using a collecting solution containing a collector such as a magnesium compound, a calcium compound, a magnesium and calcium-containing compound or a mixture thereof, and a small amount of a manganese (II) salt.

3 Claims, 1 Drawing Figure

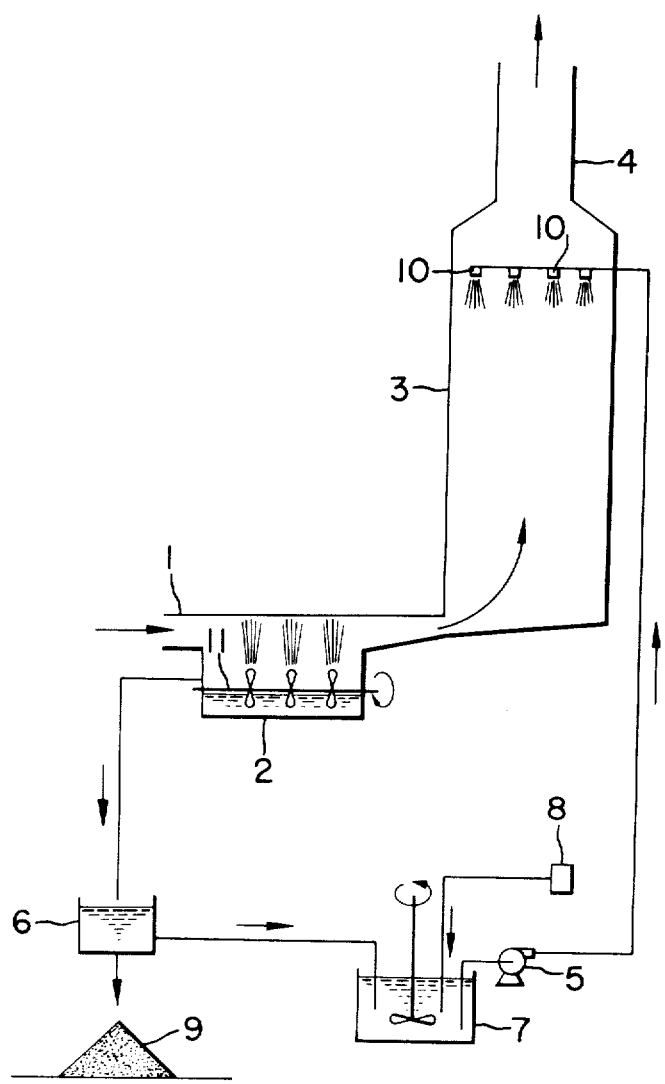

METHOD FOR DIRECTLY PREPARING A SULFATE OR SULFATES FROM EXHAUST GASES CONTAINING $SO_2$ GAS

FIELD OF THE INVENTION

This invention relates to a method for directly preparing a sulfate or sulfates such as magnesium sulfate and/or calcium sulfate by treating exhaust gases emitted from a steam-power plant or other industrial plants.

ILLUSTRATION OF THE PRIOR ART

Magnesium sulfate is widely used as a fertilizer, for industrial chemicals, and as a culturing medium for use in preparing petroleum protein. Magnesium sulfate has been obtained from bittern which is a secondary product in salt manufacture, or obtained from kieserite ($MgSO_4 \cdot H_2O$). However, since today the production of salt mostly depends upon the so-called ion-exchange membrane method, it is difficult to obtain bittern for the preparation of magnesium sulfate.

A lime process and a magnesium oxide process have been well known in the art as desulfurization processes of an exhaust gas. A product obtained from these processes contains as its main components calcium sulfite ($CaSO_3 \cdot \frac{1}{2}H_2O$) and magnesium sulfite ($MgSO_3 \cdot 6H_2O$). Furthermore, in the lime process, 15 – 25% by weight of calcium sulfate ($CaSO_4 \cdot 2H_2O$) is secondarily produced, while in the magnesium oxide process, 20 – 30% by weight of magnesium sulfate ($MgSO_4$) is secondarily produced. The secondary production of these sulfates ($CaSO_4 \cdot 2H_2O$ and $MgSO_4$) is due to oxidization of said sulfites by excessive oxygen gas which is contained in an exhaust gas.

Among various methods which have been employed for obtaining calcium sulfate from a precipitate produced by the lime process, most widely used is a method in which the precipitate is treated by addition of sulfuric acid (pH of about 2) at an elevated temperature ($60° – 70°C$) and under pressurized conditions ($5$ $Kg/cm^2$). The method has, however, disadvantage that the addition of sulfuric acid causes regeneration of sulfur dioxide.

BRIEF DESCRIPTION OF THE INVENTION:

A primary object of the invention is to provide a method of preparing at least one sulfate directly from an exhaust gas emanating from a steam-power plant or other industrial plants.

A further object of the invention is to provide a method of preparing sulfates directly from an exhaust gas emanating from a steam-power or other industrial plants, by contacting the exhaust gas with an alkaline collecting solution, said collecting solution containing therein a manganese (II) salt in an amount equivalent to or slightly greater than that of oxygen dissolved in the collecting solution so as to inactivate or break out the oxygen in the collecting solution as $MnO_2$ to prevent oxidization.

A still further object of the present invention is to provide a method of preparing sulfates wherein a collector is effectively utilized by adding a manganese (II) salt to a collecting solution containing the collector, and wherein a sulfite which has been collected in an alkaline zone is dissolved in an acidic zone in the form of an acid sulfite by the use of sulfurous acid gas contained in an exhaust gas and at the same time is reacted with an excess of oxygen in the exhaust gas to release $Ca^{++}$ and $SO_4^{--}$ simultaneously, thus growing a crystal of previously formed sulfate to a large size to permit readily separation of the crystal from the collecting solution.

Another object of the invention is to provide a method of preparing sulfates wherein disassociated sulfurous acid ($H_2SO_3$) is used for maintaining the acidity (pH of about 2.5) of a collecting solution in an acidic zone.

BRIEF DESCRIPTION OF THE DRAWING

The sole drawing is a diagrammatical view illustrating a process for the direct preparation of a sulfate from exhaust gases, in accordance with the present invention.

DETAILED DESCRIPTION OF THE INVENTION

According to the present invention, there is provided a method of directly preparing at least one sulfate using an exhaust gas containing $SO_2$ gas, the method comprising the steps of: feeding the exhaust gas to an alkaline zone for contact with a collecting solution containing a collector selected from a group consisting of a magnesium compound, a calcium compound, a magnesium and calcium-containing compound and the mixture thereof, and a small amount of manganese (II) salt, to form at least one crystallized sulfite in said alkaline zone; feeding said sulfite to an acidic zone to convert the same into the corresponding at least one sulfate; taking out a mixture of said collecting solution and said sulfate; and separating said sulfate from said mixture. The sulfate is calcium sulfate where calcium carbonate, slaked lime or the mixture thereof is used as a calcium compound.

Magnesium sulfate is obtained where magnesium hydroxide, magnesium carbonate or the mixture thereof is employed as a magnesium compound. Moreover, where dolomite or the mixture of the calcium and magnesium compounds is used as a collector, magnesium and calcium sulfates can be obtained simultaneously. As for the manganese (II) salt, there is preferably used manganese (II) sulfate or manganese (II) chloride.

The production of a sulfate along with that of a sulfite in various desulfurization processes of exhaust gases are considered to be due to conversion of sulfites into sulfates by oxidization by the action of oxygen contained in the exhaust gases, and due to presence of a slight amount of sulfuric acid anhydride and/or sulfuric acid in the exhaust gases.

When an exhaust gas is dissolved in a collecting solution for deactivating oxygen gas contained in the exhaust gas, this prevents the formation of sulfates which are an oxidized product of sulfites. For example, when a manganese (II) salt is added to a collecting solution which contains magnesium hydroxide, the following reactions occur in an alkaline zone (pH value of about 8 – 14),

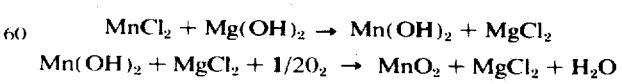

$$MnCl_2 + Mg(OH)_2 \rightarrow Mn(OH)_2 + MgCl_2$$

$$Mn(OH)_2 + MgCl_2 + 1/2O_2 \rightarrow MnO_2 + MgCl_2 + H_2O$$

Thus, dissolved oxygen is deactivated. At the same time, sulfur dioxide will be reacted with magnesium hydroxide in the following manner.

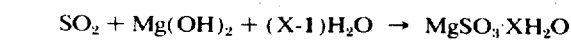

$$SO_2 + Mg(OH)_2 + (X-1)H_2O \rightarrow MgSO_3 \cdot XH_2O$$

where $X = 3$ or $6$ $MgSO_3 \cdot XH_2O$ is thus crystallized and is treated in an acidic zone, with the following reaction $$MgSO_3 \cdot XH_2O + SO_2 + H_2O \rightarrow Mg(HSO_3)_2 + XH_2O$$

Crystallized $MgSO_3 \cdot XH_2O$ is converted into water soluble acid magnesium sulfite, which is in turn oxidized by the action of oxygen contained in the exhaust gas to give magnesium sulfate ($MgSO_4$) as will be seen in the following reaction formula $$Mg(HSO_3)_2 + 1/2O_2 \rightarrow MgSO_4 + H_2SO_3$$

As will be apparent from the foregoing, the pH value of the collecting solution remains substantially constant under the influence of sulfurous acid which is formed along with the magnesium sulfate, while the magnesium sulfate is accumulated gradually in the acidic solution. To the acidic solution supplied is a predetermined amount of magnesium sulfate to re-use the same as a collecting solution, thus obtaining magnesium sulfate not containing sulfites by replenishment of magnesium hydroxide only.

This invention is based on the above finding of the particular character of the collecting solution and is concerned with a method for directly preparing a sulfate or sulfates such as magnesium sulfate and/or calcium sulfate by the treatment of an exhaust gas with use of the particular collecting solution.

A preferred embodiment of the present invention will be illustrated in detail in connection with the drawing. An exhaust gas emitted from a steam-power plant or other industrial power plants is introduced by means of a fan through a tube 1 into an acidic atmosphere container 2 having an agitator 11. The exhaust gas is passed through an acidic zone in the container 2, and is then fed to the bottom of an alkaline atmosphere tower 3. Then, the exhaust gas is upwardly fed for passing an alkaline zone of the tower 3 and is discharged from an exhaust cylinder 4.

A collecting solution which contains therein at least one of magnesium and calcium compounds such as magnesium hydroxide, magnesium carbonate, calcium carbonate, dolomite or the mixture thereof, and a small amount of a manganese (II) salt, is fed under pressure from a circulating solution reservoir by means of a circulation pump 5 and is injected or sprayed from a nozzle 10 within the tower 3. Sulfur dioxide in the exhaust gas is collected by the injected collecting solution.

A slurry including a sulfite or sulfites (containing $CaSO_3 \cdot \frac{1}{2}H_2O$, $MgSO_3 \cdot 6H_2O$ or the mixture thereof, and herein represented by $MSO_3 \cdot XH_2O$) which is transferred from the tower 3 to the container 2, is reacted in the acidic zone as follows:

$$MSO_3 \cdot XH_2O + SO_2 + H_2O \rightarrow M(HSO_3)_2 + XH_2O$$

Thus, the sulfite or sulfites contained in the slurry are converted into water-soluble acid sulfite or sulfites by the action of sulfurous acid. The acid sulfite or sulfites is then oxidized by oxygen gas in the exhaust gas in a manner as follows;

$$M(HSO_3)_2 + \frac{1}{2}O_2 + XH_2O \rightarrow MSO_4 \cdot XH_2O + H_2SO_3$$

The free sulfurous acid contributes to maintain constant the pH value of the acidic zone. The above reactions can be simply summarized as follows;

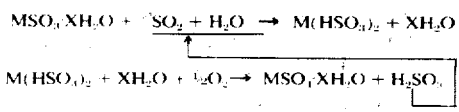

Where M is calcium in the above reaction formula, calcium sulfate ($CaSO_4 \cdot 2H_2O$) is crystallized at the bottom of the container 3. The thus crystallized calcium sulfate is then fed to a separator 6 for separating calcium sulfate 9 from a mother liquor. The separated mother liquor is in turn fed to a circulating liquid reservoir 7, to which a predetermined amount of a collector is added from a collector adding means 8.

Moreover, where M represents magnesium, magnesium sulfate ($MgSO_4$) is accumulated in the container 2, from which the magnesium sulfate is taken out in the form of solution.

As described in the foregoing, when a manganese (II) salt has previously been introduced in the collecting solution, there occurs the following reaction in the collecting solution $$M(OH)_2 + MnCl_2 \rightarrow Mn(OH)_2 + MCl_2$$

That is, the manganese (II) salt is reacted and changed into manganese hydroxide in the circulating liquid reservoir 7. The manganese hydroxide is oxidized by the action of oxygen gas dissolved in the collector thereby to form manganese dioxide, thus diactivating the oxygen gas in the alkaline zone. Accordingly, the collected $MSO_3 \cdot XH_2O$ is kept free from formation of oxide layers due to the oxidization of $MSO_3 \cdot XH_2O$. In this instance, with calcium sulfite, the formation of layers of calcium sulfate which is low in solubility can suitably be prevented.

When, the manganese dioxide which is formed in the tower 3 is transferred to the container 2, the following reaction takes place since the container has an acidic solution (having the pH value of about 2.5)

$$MnO_2 + 2H^+ \rightarrow Mn^{2+} + H_2O + \frac{1}{2}O_2$$

Thus, manganese oxide is dissolved in the acidic solution to release oxygen gas, and this oxygen gas and oxygen contained in the exhaust gas oxidize $M(HSO_3)_2$ which is contained in the solution in the acidic zone, thereby to produce $MSO_4$ and $H_2SO_3$. While, $Mn^{2+}$ is fed together with the mother liquor to the circulating liquid reservoir 7. Then, the mother liquor is mixed with a fresh collector which is fed from a collector adding means 8, and the mixture is sprayed in the upper portions of the tower 3 in a manner suitable for collecting the gas ($SO_2$) as described hereinbefore.

The manganese (II) salt in the collector is reacted in the alkaline zone as follows;

$$Mn^{2+} + 2(OH)^- \rightarrow Mn(OH)_2$$

$$Mn(OH)_2 + \frac{1}{2}O_2 \rightarrow MnO_2 + H_2O$$

The thus formed manganese dioxide is in turn reacted in the acidic zone as follows;

$$MnO_2 + 2H^+ \rightarrow Mn^{2+} + \frac{1}{2}O_2 + H_2O$$

Since the above-mentioned reactions are repeated, formation of $MSO_4$ by oxidation of $MSO_3$ is well prevented in the alkaline zone. While in the acidic zone, since $MSO_3$ is not covered with layers of $MSO_4$, the sulfite is allowed to react with sulfurous acid to readily product $M(HSO_3)_2$. At the same time, $MSO_4$ can be produced by oxidation of the $M(HSO_3)_2$ with oxygen gas which resulted from the reaction of $MnO_2$ and the acidic solution and also with oxygen contained in the exhaust gas. Thus, the sulfate or sulfates can directly be produced by the treatment of exhaust gases.

Discussion is now made of the separation of the sulfate or sulfates. With a magnesium sulfate solution, when the concentration of the magnesium sulfate reaches a predetermined amount, i.e., 600 g of $MgSO_4/l$, a portion of the solution in the acidic zone is taken out to neutralize the same by the addition of magnesium hydroxide. Then, the exhaust gas and the neutralized solution are fed in counterflows for dissolving sulfur oxides ($SO_2$, $SO_3$) of the exhaust gas in the solution in the acidic zone allowing to maintain the pH value of the solution to be maintained constantly at about 1 – 2, without adding a particular pH adjustor such as of an acid. Then, when the mother liquor thus treated is cooled, a crystal of $MgSO_4 \cdot 7H_2O$ appears. After the separation of the crystal, the mother liquor is again used as a collecting solution.

In the exhaust gas treating system described above, manganese (II) salt has been previously introduced in the collecting solution. The manganese ions are converted into manganese hydroxide in the alkaline region. This manganese hydroxide is fixed by dissolved oxygen to form manganese dioxide, so that a sulfite or sulfites produced in the alkaline region is well prevented from oxidization, thus not forming a corresponding sulfate or sulfates.

The solution in the alkaline zone becomes brown due to the formation of manganese dioxide, while in the acidic region, the manganese dioxide is dissolved to form manganese (II) ions, the solution becoming colorless.

Furthermore, where manganese (II) salt is added to the collecting solution, a produced calcium sulfite or acid calcium sulfite is easily reacted or oxidized with a nitrogen oxide contained in the exhaust gas, so as to produce calcium sulfate and nitrogen. That is, the calcium sulfite and a nitrogen oxide are reacted and decomposed into calcium sulfate and nitrogen, thus making denitrification possible.

On the other hand, where a collecting solution does not contain a manganese (II) compound, calcium sulfate films are formed on the surfaces of particles of calcium sulfite, these films block the reaction between a nitrogen oxide and calcium sulfite, without allowing decomposition into calcium sulfate and nitrogen. Thus, there occurs no denitrifying reaction.

On the contrary, where the present invention is applied to a lime process, using, for example, a collecting liquid containing slaked lime and a manganese (II) salt, a reaction similar to that for magnesium hydroxide occurs in a manner as follows;

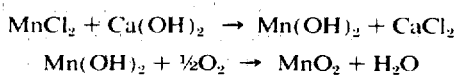

As is apparent from the above formula, oxygen dissolved in the collecting solution is deactivated. Thus, calcium sulfite precipitated in the alkaline region is not converted into calcium sulfate by oxidization. However, when calcium sulfite is transferred to the acidic zone, the following reaction occurs:

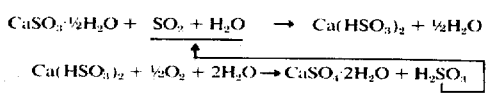

In the acidic zone, calcium sulfate is produced and at the same time sulfurous acid is secondarily produced. The sulfurous acid serves to maintain the collecting liquid in an acidic condition (pH of about 2.5) and to dissolve the manganese dioxide.

Furthermore, where there is used a collecting solution which contains a collector such as of calcium carbonate, dolomite, magnesium carbonate or magnesium hydroxide, and a manganese (II) salt, reactions similar to the foregoing reactions occur as shown in the following with respect to the respective collectors.

Calcium carbonate

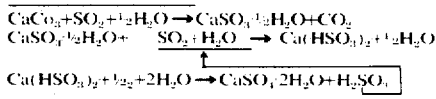

Dolomite

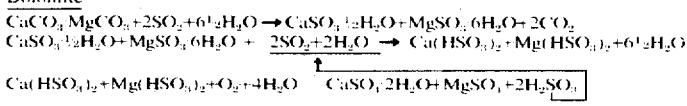

Magnesium carbonate

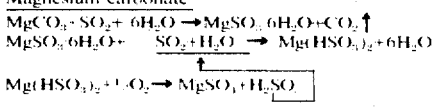

Magnesium hydroxide

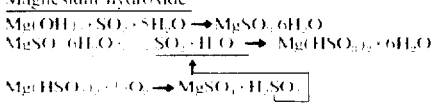

In the above reactions, calcium sulfate is obtained in the form of crystal and magnesium sulfate in the form of an aqueous solution.

In order to grasp the degree of conversion of a sulfite or sulfites into a sulfate or sulfates in the acidic zone when producing calcium sulfate in a manner as shown by the above-mentioned reaction formula, an acidic solution having a ph value of about 2.5 is sampled on a deck glass for microscopic analysis. Such analysis reveals that an initial granular crystal of the calcium sulfite gradually disappears, and is converted into acid calcium sulfite. The acid calcium sulfite is oxidized by air to form a monoclinic crystal of calcium sulfate in a position different from that of the initial crystal. That is, the calcium sulfite is not directly converted into calcium sulfate by oxidization, but is once dissolved in $H_2SO_3$ to form $Ca(HSO_3)$ which is then oxidized to form $CaSO_4 \cdot 2H_2O$ in a position different from the position of the original calcium sulfite. Moreover, secondarily produced $H_2SO_3$ dissolves another $CaSO_3 \cdot \frac{1}{2}H_2O$. Again, the above-mentioned oxidization is repeated. It will be well understood from this that the crystallization of $CaSO_4 \cdot 2H_2O$ occurs as shown in the foregoing reaction formula.

On the contrary, if an exhaust gas is treated by a collecting liquid which does not contain a manganese (II) salt, and then the crystal obtained is also treated with a sulfur dioxide gas until the pH value of the solution reaches about 2.5, such conversion of the crystal as mentioned above is not observed. This is due to the fact that surfaces of the crystal of calcium sulfite are oxidized and converted into calcium sulfate, which forms stable films of fine crystalline particles.

In order to confirm the above fact, the crystal which is obtained by using a collector composed of slaked lime alone is subjected to an analysis of its components. Analytical results are as follows:

| | | |
|---|---|---|
| $CaSO_3 \cdot \frac{1}{2}H_2O$ | : | 75.55 % by weight |
| $CaSO_4 \cdot 2H_2O$ | : | 15.23 % by weight |
| $CaCO_3$ | : | 5.26 % by weight |
| $Ca(OH)_2$ | : | 3.86 % by weight |

Furthermore, when the crystal is subjected to a microscopic analysis, the crystal of calcium sulfate can not be detected. This is considered to be due to a fact that the calcium sulfate forms films so that calcium sulfite and unreacted $CaCO_3$ and $Ca(OH)_2$ are confined within the films. That is, where a manganese (II) salt is not added to a collector, or sulfite or sulfites which are collected on surfaces of particles of the collector in the alkaline zone, are oxidized by air to form films of a sulfate or sulfates. This films prevent the penetration of sulfurous acid gas into the inside of the collecting agent particles. Consequently, not only the collecting agent is not effectively utilized, but also sulfate can not be collected effectively due to the existence of the films even if the film-formed collector particles are fed to the acidic region. For the collection, it is necessary to further oxidize the films of the sulfate.

Discussion is now focussed on the amount of the manganese (II) salt to be added to the collecting solution. Generally, the temperature of the collecting solution is within a range of 40° to 60°C. When the temperature is considered to be 50°C in average, the solubility of oxygen in water is 0.00122 g/100 cc when determined in accordance with Winkler's Method. An amount of manganese equivalent to the solubility of oxygen is as follows: 0.0122 g $O_2/1$ = 0.067 g of $Mn(OH)_2/1$ = 0.0663 g of $MnO_2/1$ = 0.0419 g of Mn/1 = 0.1509 g of $MnCl_2 \cdot 4H_2O/1$ = 0.2113 g of $MnSO_4 \cdot 7H_2O/1$ = 0.00077 moles/1

The collecting solution containing a collector dissolves therein collected compounds such as magnesium sulfate, so that the amount of oxygen dissolved becomes smaller in a degree corresponding to the amount of the dissolved substances other than oxygen. Hence, the above-mentioned amount or a slight excess of the manganese (II) salt may be added to the collecting solution. This is consistent with test results. Therefore, even if there exists oxygen in an exhaust gas fed in the alkaline region in an amount far greater than dissolved oxygen contained in the collecting solution, the oxygen will be deactivated by the catalytic action of manganese dioxide produced, so that the oxidization of a sulfite to a sulfate is prevented.

When magnesium sulfate or calcium sulfate is directly continuously produced as described in the foregoing, the manganese (II) salt is scarecely consumed, so that the production can be continued over a long period of time without replenishment of the manganese (II) salt.

General liquid-gas ratios for different types of counter-flow gas collecting devices are shown in the following. The amount of a manganese (II) salt can be obtained by calculation.

| | | |
|---|---|---|
| Spray Tower | 0.2–1.5 | kg/kg |
| Cyclone Scrubber | 0.5–1.5 | $1/m^3$ |
| Packed tower | 0.5–2.0 | kg/kg |
| Wood-grid packed tower | 0.3–3 | kg/kg |
| Peebody scrubber | 2–4 | $1/m^3$ |
| Impulse scrubber | 0.3 | $1/m^3$ |
| Doil Scrubber | 0.1–0.3 | $1/m^3$ |
| S G scrubber | 0.01–2.0 | $1/m^3$ |

The acidic region herein described intends to mean a region having a pH value smaller than that of the neutral point or decomposition point of the collector used. For example, with cacium carbonate ($CaCO_3$), dolomite ($MgCO_3 \cdot CaCO_3$) and magnesium carbonate ($MgCO_3$), the pH value of the acidic region should be smaller than 3.9. On the other hand, with calcium hydroxide ($Ca(OH)_2$), and magnesium hydroxide ($Mg(OH)_2$), the acidic region should be smaller than 7 in pH value.

On the contrary, the alkaline region means a region having a pH value greater than that of the above-mentioned number.

According to the general concept of pH, a decomposition point, pH 3.9, of a carbonate such as calcium carbonate by the action of an acid is apparently acidity. On the other hand, a hydroxide such as calcium hydroxide is easily converted into a carbonate by means of carbon dioxide which is contained in an exhaust gas (in 12 – 16%). Accordingly, in the present invention, the decomposition point of a carbonate, i.e., pH 3.9, is determined as a border line between the acidic region and the alkaline region.

The invention will be particularly illustrated in the following examples.

EXAMPLE 1

1. Collecting Solution

A solution substantially composed of a slurry containing 5% by weight of slaked lime ($Ca(OH)_2$, purity of 92.68%) and manganese (II) chloride ($MnCl_2 \cdot 4H_2O$) in a ratio of 0.2 g/l.

2. Treated gas

A gas containing 0.15% (by volume) of $SO_2$.

3. Crystals in the acidic region (% by weight)

| | |
|---|---|
| $CaSO_4 \cdot 2H_2O$ | 99.20 |
| $CaSO_3 \cdot \tfrac{1}{2}H_2O$ | 0.75 |

4. Mother liquor composition obtained from the acidic region (g/l) and the pH value thereof

| | |
|---|---|
| $Ca(HSO_3)_2$ | 16.325 |
| $CaSO_4$ | 1.283 |
| $MnCl_2$ | 0.1261 |
| pH | 2.7 |

EXAMPLE 2

1. Collecting solution

A solution substantially composed of a slurry containing 5% by weight of calcium carbonate ($CaCO_3$, purity of 98.42%, smaller than 200 mesh) and manganese (II) chloride ($MnCl_2 \cdot 4H_2O$).

2. Treated gas

The same gas as used in Example 1.

3. Crystals in the acidic region (% by weight)

| | |
|---|---|
| $CaSO_4 \cdot 2H_2O$ | 96.821 |
| $CaSO_3 \cdot \tfrac{1}{2}H_2O$ | 0.038 |
| $CaCO_3$ | 3.075 |

4. Mother liquor composition (g/l) obtained from the acidic region and the pH value thereof

| | |
|---|---|
| $CaSO_4$ | 3.246 |
| $Ca(HSO_3)_2$ | 22.134 |
| $MgSO_4$ | 2.870 |
| $MgCl_2$ | 0.132 |
| pH | 1.5 |

The crystal of $CaCO_3$ in (3) is coarse particles (5 μ), which are originally contained in the starting material.

EXAMPLE 3

1. Collecting solution

A solution substantially composed of a slurry containing 7% by weight of a mixture which contains slaked lime ($Ca(OH)_2$, purity of 92.84% by weight) and magnesium hydroxide ($Mg(OH)_2$, purity of 96.34% by weight) in a mixing ratio of 2:4, and manganese (II) chloride in an amount of 0.2 g/l.

2. Treated Gas

The same gas as used in Example 1

3. Crystal in the acidic region (% by weight)

| | |
|---|---|
| $CaSO_4 \cdot 2H_2O$ | 98.002 |
| $CaCO_3$ | 1.252 |
| $MgCO_3$ | 1.631 |
| $CaSO_3 \cdot \tfrac{1}{2}H_2O$ | 0.061 |

4. Mother liquor composition (g/l) obtained from the acidic region and characteristics thereof

| | |
|---|---|
| $MgSO_4$ | 226.719 |
| $Ca(HSO_3)_2$ | 2.919 |
| $Mg(HSO_3)_2$ | 1.325 |
| $MgCl_2$ | 0.238 |
| pH | 2.5 |
| Density | 1.2556 |

EXAMPLE 4

1. Collecting Solution

Solution substantially composed of a slurry containing 5% by weight of magnesium hydroxide ($Mg(OH)_2$, purity of 96.34% by weight) and manganese (II) chloride ($MnCl_2 \cdot 4H_2O$) in an amount of 0.2 g/l.

2. Treated gas

The same gas as used in Example 1.

3. Mother liquor in the acidic region

The mother liquor shows slight white-colored turbidity. This is considered due to the formation of calcium sulfate resulted from calcium contained in the sample, so that the white-colored substance is not separated from the liquor.

4. Mother liquor composition (g/l) obtained from the acidic region and characteristics thereof

| | |
|---|---|
| $MgSO_4$ | 109.480 |
| $Mg(HSO_3)_2$ | 4.682 |
| $CaSO_4$ | 1.402 |
| $MgCl_2$ | 0.152 |
| pH | 2.2 |
| Density | 1.1098 |

In the foregoing Example 3, when a slight excess of magnesium hydroxide is added to the mother liquor taken out from the acidic region thereby to make the pH value of the liquor at 9.4. Then, the following reactions take place.

$$Mg(HSO_3)_2 + Mg(OH)_2 + 10H_2O \rightarrow 2MgSO_3 \cdot 6H_2O$$

$$MnCl_2 + Mg(OH)_2 \rightarrow Mn(OH)_2 + MgCl_2$$

The reaction mixture is separated into liquid and solid, and the separated solid is used by mixing with a collecting solution. The separated lucid liquid is condensed at its boiling point until the same has a density of 1.35. Then, the condensed liquid is cooled to give $MgSO_4 \cdot 7H_2O$ having a purity of 99.0% by weight.

What is claimed is:

1. In a continuous cyclic process for producing alkali earth sulfates from an exhaust gas containing $SO_2$ which comprises passing said exhaust gas through a scrubbing zone while simultaneously passing a collecting solution through said zone, said collecting solution containing (a) at least one collector selected from the group consisting of calcium hydroxide, calcium carbonate, magnesium hydroxide, magnesium carbonate and dolomite together with (b) a manganese (II) salt, thereby forming calcium and/or magnesium sulfates in said zone as a result of said passage and the contacting of said exhaust gas with said collecting solution, recovering the formed sulfates from the collecting solution, and then recycling said collecting solution to said scrubbing zone while replenishing the collector in the recycling solution, the improvement comprising separating said scrubbing zone into two distinct zones one of which is an alkaline zone and the other an acidic zone, passing said exhaust gas first through said acidic zone and then through said alkaline zone while simultaneously passing said collecting solution first through said alkaline zone and then through said acidic zone, said manganese (II) salt being present in an amount sufficient to react with the oxygen in said collecting solution to form $MnO_2$ in said alkaline zone or in slight excess of said amount whereby a sulfate-free calcium and/or magnesium sulfite slurry is formed in said alkaline zone, and passing said slurry to said acidic zone wherein said $MnO_2$ acts to oxidize said sulfites to form said sulfates.

2. The process of claim 1 wherein the acidic zone has a pH of about than 3.9.

3. The process of claim 1 wherein the manganese (II) salt is selected from the group consisting of manganese (II) sulfate and manganese (II) chloride.

* * * * *